(12) United States Patent
Lin et al.

(10) Patent No.: US 7,495,043 B2
(45) Date of Patent: *Feb. 24, 2009

(54) METHOD FOR PRODUCING CLAY/AMO COMPLEX AND NANOSILICATE PLATE

(75) Inventors: Jiang-Jen Lin, Taichung (TW); Chung-Ming Tsai, Ping-Tung County (TW)

(73) Assignee: National Chung-Hsing University, Taichung (TW)

( * ) Notice: Subject to any disclaimer, the term of this patent is extended or adjusted under 35 U.S.C. 154(b) by 480 days.

This patent is subject to a terminal disclaimer.

(21) Appl. No.: 11/147,761

(22) Filed: Jun. 8, 2005

(65) Prior Publication Data

US 2005/0239943 A1 Oct. 27, 2005

Related U.S. Application Data

(62) Division of application No. 10/270,227, filed on Oct. 15, 2002, now Pat. No. 7,094,815.

(51) Int. Cl.
*C08K 3/34* (2006.01)
*C08L 61/00* (2006.01)

(52) U.S. Cl. .................. 523/216; 524/445; 524/446; 524/447; 524/449; 524/595

(58) Field of Classification Search .................. 524/445
See application file for complete search history.

(56) References Cited

U.S. PATENT DOCUMENTS

| 5,101,060 | A | * | 3/1992 | Speranza et al. | 558/390 |
| 6,107,387 | A | * | 8/2000 | Kaylo et al. | 524/445 |
| 6,765,050 | B2 | * | 7/2004 | Lin et al. | 524/445 |
| 2006/0063876 | A1 | * | 3/2006 | Lin et al. | 524/445 |

OTHER PUBLICATIONS

Merriam-Webster Dictionary website, URL: <http://www.merriam-webster.com/dictionary/power>, retrieved on Aug. 19, 2008.*

* cited by examiner

*Primary Examiner*—Vasu Jagannathan
*Assistant Examiner*—Vickey Ronesi
(74) *Attorney, Agent, or Firm*—Charles E. Baxley

(57) ABSTRACT

The present invention discloses a method for producing a clay/AMO complex by modifying layered inorganic silicate clay with the intercalating agent AMO (amine-terminated Mannich oligomer). The AMO is prepared by polymerizing polyoxyalkylene amine having molecular weight over 1000, p-cresol and formaldehyde. The present invention also discloses a method for producing nanosilicate plates by extracting the AMO from the above complex with a hydroxide or a chloride of alkali metal or alkaline-earth metal. The extracted AMO can be recycled for reusing.

14 Claims, 2 Drawing Sheets

METHOD FOR PRODUCING CLAY/AMO COMPLEX AND NANOSILICATE PLATE

CROSS REFERENCE

The present Application is a Division of U.S. application Ser. No. 10/270,227 by the same inventors filed on Oct. 15, 2002 now U.S. Pat. No. 7,094,815.

BACKGROUND OF THE INVENTION

1. Field of the Invention

The present invention relates to a method for producing a clay/AMO complex and, more particularly, to a method for producing a silicate clay/AMO complex in which the AMO (amine-terminated Mannich oligomer) is prepared from the Mannich reaction of p-cresol and serves as an intercalating agent. The present invention also relates to a method for producing nanosilic plates from the clay/AMO complex.

2. Related Prior Art

Currently, inorganic/organic polymer complex materials under a nanoscale regime are one of the most significant materials, and thus have been widely investigated and developed. Such complex materials are dual-phased wherein at least one phase is dispersed under a nanoscale regime. Accordingly, compatibility between the two phases, for example, clay and polymers, is always essential for the nanoscale dispersion.

For layered silicate clay which is hydrophilic and immiscible with most organic solvents, the interlayer distances can be enlarged by means of intercalating with organic quaternary ammonium, and thus monomers are allowed to enter therethrough. The monomers can be polymerized within the interlayer space to obtain an exfoliated inorganic/organic polymer complex material. In principle, the distances, enlarged by intercalating agents, are constant and required to be wide enough for monomer or polymer molecules to enter. As for exfoliation, the interlayer distances are irregular and different directions may occur in each layer.

Conventional intercalating agents such as 12-aminolauric acid, hexadecylamine, fatty amine, bis(2-hydroxyethyl)methyl tallow alkyl amine and stearylamine, usually have low molecular weights and can be converted into the corresponding ammonium salts such as quaternary chloride salt, and interlayer distances of the clay can be ionically exchanged and hence sterically expanded to a certain degree of interlayer spacing.

Referring to the research of T. J. Pinnavaia (Michigan State University), intercalating agent $CH_3(CH_2)_n-NH_3^+$ is provided to exchanged with metal ion salts within the layer-structural montmorillonite (MMT) in resulting intercalated MMT, which is then dispersed in diglycidyl ether of BPA (such as epoxy resin Shell Epon828) to form a epoxy polymer-clay complex material under a well-dispersed nanoscale regime. For such intercalating agent, the interlayer distances can be enlarged to 18.0 Å. The epoxy resin can then form an epoxy/clay material through curing polymerization at 75° C. This reference also indicates an improvement in heat distortion temperature. The intercalating agent performs a rule of monolayer to bilayer, and even to pseudo-trimolayer. The interlayer distance ranges between 13.8-18.0 Å, which allow the epoxy resin to enter and polymerize therein, and further to exfoliate the layered inorganic matter so that application advantages of nonomaterials can be achieved.

Japanese Patent No. 8-22946 discloses the first commercial inorganic/organic polymer complex material under a nanoscale regime, which is developed by Toyota Company. This complex material is produced by dispersing $[H_3N^+(CH_2)_{11}COO^-]$-montmorillonite in Nylon 6, wherein the aminocarboxylic acid is provided as an intercalating agent and the polymers are formed between layers of the amino acid intercalated clay through condensation of caprolactam monomers to Nylon 6 polymer. However, the aminocarboxylic acid intercalating agent is hydrophilic and doesn't facilitate non-polar polymers such as polyethylene and polypropylene, to uniformly disperse in the hydrophilic layered silicate. Accordingly, Japanese Patent Publication No. 8-53572 provides other organic onium ions as an intercalating agent to mix with layered silicate, which can be uniformly dispersed in molten polyolefin resin. Unfortunately, though the organic onium ions can enlarge the interlayer distances to certain degree, affinity between the intercalating agent and the polyolefin resin is not enough to exfoliate the layered silicate. Further, Japanese Patent Publication No. 10-182892 indicates that when blending in a molten mixture containing olefin oligomers with H-bond and polyolefin resin, the organized layered silicate might be indefinitely swelled due to the strong affinity therebetween. However, it's a dilemma whether to increase the oligomers for better dispersing or to decrease the oligomers for better mechanical characteristics.

Accordingly, there is a need to ameliorate the complexes by means of providing appropriate intercalating agents which could render the intercalated silicates with a wider interlayer distance and tailored spacing for more compatible with polymer materials. Furthermore, the widely opened silicates can be further tailored and used as novel inorganic/organic surfactants, an important industrial application but deviated from the common nanocomposite usages.

SUMMARY OF THE INVENTION

An object of the present invention is to provide a method for producing a layered silicate clay/AMO complex, whereby the clay/AMO complex can exhibit excellent interfacial and surfactant effect and be applied to facilitate emulsion process as well as reinforcing polymers.

Another object of the present invention is to provide a method for producing nanosilicate plates from the clay/AMO complex, whereby the intercalating agent AMO (amine-terminated Mannich oligomer) can be recycled for reusing.

Accordingly, the method for producing the clay/AMO complex includes at least one step of intercalating the layered inorganic silicate clay with the AMO by powerfully stirring at 60-180° C. to perform cation exchange reaction. The AMO in the form of a straight-chain polymer serves as an intercalating agent in this method. The AMO can be formed by polymerizing polyoxyalkylene amine having a molecular weight over 1000, p-cresol and formaldehyde.

Before the cation exchange reaction, the AMO is preferably acidified with an inorganic acid (such as hydrochloric acid) to convert amine into quaternary ammonium salt, and the inorganic clay is preferably swelled with water to allow the silicate layers fill with water as medium.

By modifying with the AMO, the hydrophilic clay becomes hydrophobic and miscible with organic polymers. Furthermore, the interlayer distances of the clay are enlarged to 20-98 Å so as to allow polymers easily intercalate therebetween. As shown in FIG. 1, the quaternary ammonium compound is present in a zig-zag stretched form.

When the mole ratio of the intercalating agent to the CEC of the clay ranges from 1:3 to 2:1, and the mole ratio of the CEC to the inorganic acid is about 1:1, the complex has a layered structure and the interlayer distances ranges 20~98 Å.

Such complex can serve as carriers of pharmaceuticals or other organic components for the particular purpose of release control.

When the mole ratio of the intercalating agent to the CEC of the clay is more than 2:1, and the mole ratio of the CEC to the inorganic acid is more than 2:1, the complex has an exfoliative structure as no readable diffractive pattern under the X-ray diffractive analysis. That is, the inorganic acid molar ratio is an important factor in controlling the clay/AMO interaction.

The cation exchanging is usually performed at 80-160° C., and preferably at 80-120° C.

The aforementioned inorganic acid is not restricted and can be hydrochloric acid, sulfuric acid, phosphoric acid or nitric acid.

The inorganic clay used in the present invention preferably has a cation exchange capacity (CEC) ranging 50~200 meq/100 g, and can be, for example montmorillonite, kaolin, mica and talc.

The organic solvent aforementioned can be but not limited to ether, ketone, ester, nitrile, saturated hydrocarbon, chloric saturated hydrocarbon or aromatic hydrocarbon, for example, tetrahydrofuran, isopropyl ether, methyl tert-butyl ether, methyl isobutyl ketone, acetonitrile, ethyl acetate, pentane, hexane, heptane, cyclohexane, dichloromethane, benzene, toluene, dimethylbenzene, chlorobenzene and methoxybenzene.

The aforementioned polyoxyalkylene amine can be polyoxypropylene diamine, polyoxyethylene diamine, or poly(oxyethylene-oxypropylene)diamine, wherein the polyoxypropylene diamine is preferred. The commercial polyoxyalkylene amine includes Jeffamine D2000 [poly(propylene glycol) bis (2-aminopropyl ether), Mw 2000], Jeffamine D4000 [poly (propylene glycol) bis(2-aminopropyl ether), Mw 4000], Jeffamine ED2001 [poly(propylene glycol)-block-poly(ethylene glycol)-block-poly (propylene glycol) bis(2-aminopropyl ether), Mw 2000], T3000 [tri-functional poly(propylene glycol)-2-aminopropyl ether, Mw 3000], T5000 [tri-functional poly(propylene glycol)-2-aminopropyl ether, Mw 5000], etc., wherein the Jeffamine D2000 is preferred. The Jeffamine series product has formulae as follows:

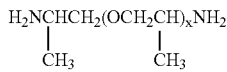

wherein x=33 (Approx. Mw=2000; Jeffamine® D-2000); or x=68 (Approx. Mw=4000; Jeffamine® D-4000);

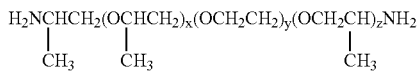

wherein x+z≈5, y≈39.5 (Approx. Mw=2000; Jeffamine® ED-2001).

The complex produced in accordance with the method of the present invention can serve an oily surfactant, a polymer modifier or a hardening agent of epoxies.

The clay/AMO complex obtained in the above method can be further used to produce nanosilicate plates. First, an emulsion A is prepared by dissolving the complex in an organic solvent at a specific temperature. Simultaneously, an emulsion B is prepared by blending the layered inorganic silicate clay with hot water. Then the emulsion A and the emulsion B are mixed. By adding a hydroxide or a chloride of alkali metal or alkaline-earth metal into the solution, the organic AMO is released into the solution from the complex. Finally, the mixture is settled for a period of time to obtain the AMO intercalation agent in an organic phase and nanosilicate plates with a high aspect ratio in a water phase. In the above procedures, powerfully blending is preferred for mixing.

The organic solvent can be those used for producing clay/AMO complex. The above hydroxide or chloride of alkali metal or alkaline-earth metal can be but not limited to sodium hydroxide, potassium hydroxide, sodium carbonate and sodium bicarbonate.

DESCRIPTION OF THE PREFERRED EMBODIMENTS

Figure 1:
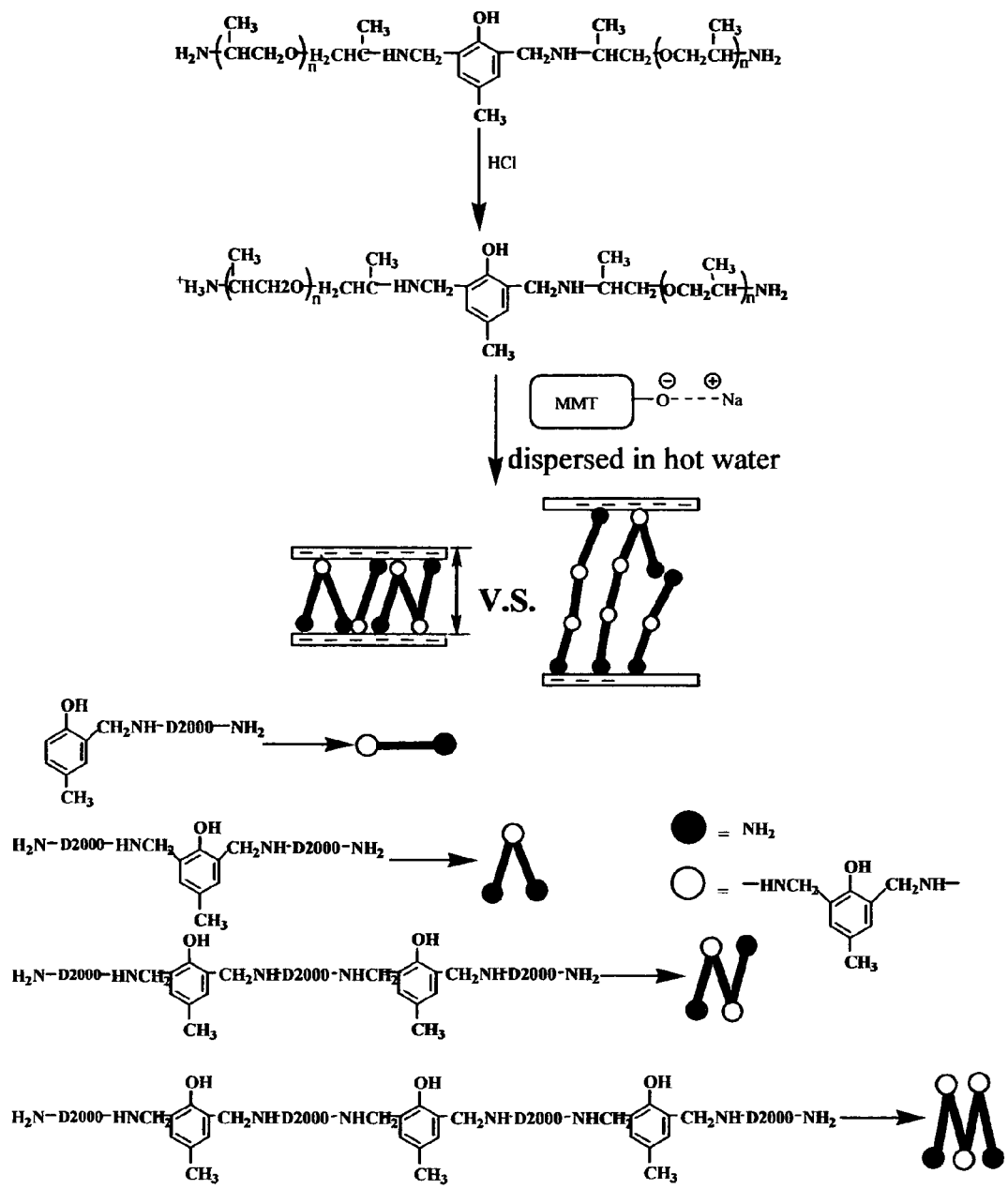
FIG. 1 shows the reaction of the present invention.

In order to explicitly explain the present invention, some preferred examples are described in detail as the follows. However, it should be noticed that the scope of the present invention is not limited to these examples.

In these examples, montmorillonite (MMT) is used, which is alumino-silicate clay, and has a structural formula including two layers of tetrahedral silicate and one layer of octahedral alumina therebetween. In general, the primary structure of the MMT includes average 10 parallel lamellae and is about 100 Å high with interlayer distances about 12 Å. The secondary structure of the MMT is about size 0.1-10µ in diameter and can be formed by aggregating hydrophilic silicate thereof.

The clay such as MMT may have cation exchange capacity (CEC) in a wide range, and preferably within 50-200 meq/100 g. Beyond such a range, the clay is difficult to be swelled because of insufficient ion exchange or excessive interlayer attraction. The MMT used in the following examples is Kunipia F ($Na^+$-MMT, CEC=115 meq/100 g). Other materials include p-cresol (ACROS Co., Mw 108, m.p. 31-34° C., b.p. 202° C.), poly (propylene glycol) bis(2-amino propyl ether) (Huntsman Chemical Co., trademark Jeffamine D2000, Mw 2000), and formaldehyde (ACROS Co., Mw 30, 37 wt % aqua solution).

EXAMPLES 1-5

The complexes of the present invention are produced according to steps of:

Step 1: Swelling the Layered Inorganic Silicate Clay (Sodium Form of Montmorillonite or $Na^+$-MMT)

$Na^+$-MMT (5 g) is dispersed in water (1,000 ml, 80° C.) by powerfully stirring for four hours, and then a stable and uniform slurry in earth color is formed.

Step 2: Synthesizing the Intercalating Agent AMO

P-cresol (5 g, 0.046 mol) and D2000 (185 g, 0.092 mol) are mixed by refluxing in toluene at 90° C. for 3 hours by using a Dean-Stark trap. Formaldehyde solution (37%, 10 g, 0.12 mol) is then added into the solution and heated to 130° C. for 5 hours. The reaction is stopped after removing the generated water before the formation of AMO gel. By measured with GPC, four peaks of Mw 2598, 5842, 9234 and 16952 oligomers can be observed. Four oligomers are analogs which can be used as such for intercalation. The titration values of primary amine, secondary amine and tertiary amine are 0.37 meq/g, 0.62 meq/g and 0 meq/g, respectively.

Step 3: Acidifying the Intercalating Agents

The intercalating agent AMO (13.5) is dissolved in water, and then equivalent moles of hydrochloric acid is added into therein at 80° C. to perform acidification for 30 minutes. The molar ratio of intercalating agent and HCl is varied in controlling the intercalation or exfoliation of MMT.

Step 4: Intercalating the AMO to the Layered Inorganic Silicate Clay

The acidified AMO is added into the slurry of Step 1 according to ratios of Table 1, and then powerfully stirred at 80° C. for 5 hours to perform cation exchange. The mixture is then settled and filtered. The product is dried in a vacuum oven for 24 hours to remove water. The tint solid, MMT/AMO complex, can be observed. The interlayer distances are detected with X-ray diffraction and listed in Table 1.

EXAMPLE 6

Repeat steps of Example 1, but HCl is added in a different ratio to the MMT as listed in Table 1. The interlayer distance of the product is measured by X-ray diffraction and listed in Table 1.

COMPARATIVE EXAMPLE 1

Repeat steps of Example 1, but no HCl is provided for acidification. The interlayer distance of the product is measured by X-ray diffraction and listed in Table 1.

TABLE 1

Intercalating MMT by using AMO/HCl at different ratio

| | AMO:MMT[a]:HCl (mole ratio) | Interlayer distance (Å) | Intercalating agent/clay[b] (w/w %) | Intercalating agent/clay[c] (w/w %) |
|---|---|---|---|---|
| Example 1 | 1:3:3 | 39.4 | 48/52 | 45/55 |
| Example 2 | 1:2:2 | 50-52 | 61/39 | 57/43 |
| Example 3 | 2:3:3 | 50-52 | 66/34 | 66/34 |
| Example 4 | 1:1:1 | 50-52 | 73/27 | 72/28 |
| Example 5 | 2:1:1 | 61 | 83/17 | 83/17 |
| Example 6 | 2:1:0.5 | Exfoliate | 85/15 | 83/17 |
| Comparative Example 1 | 1:1:0 | 12 | — | — |

[a]by CEC of MMT
[b]by thermal gravimetric analysis (TGA)
[c]by calculation

As listed in Table 1, the interlayer distances of Examples 1-5 are significantly larger than that of MMT without intercalation. In Examples 1-5, it's obvious that the interlayer distances increase when more AMO is added. Further, when the ratio of AMO to MMT is up to 2, exfoliation occurs in Example 6 by decreasing the acidifying agent HCl.

In Examples 1-6, emulsion occurs during reaction and the product settles as precipitates. However, no precipitate is observed during operation of Comparative Example 1, and the interlayer distance is the same as the MMT, 12 Å. That is, no intercalation can be carried out without pre-treating the intercalating agent with an acidifying agent.

Figure 2:
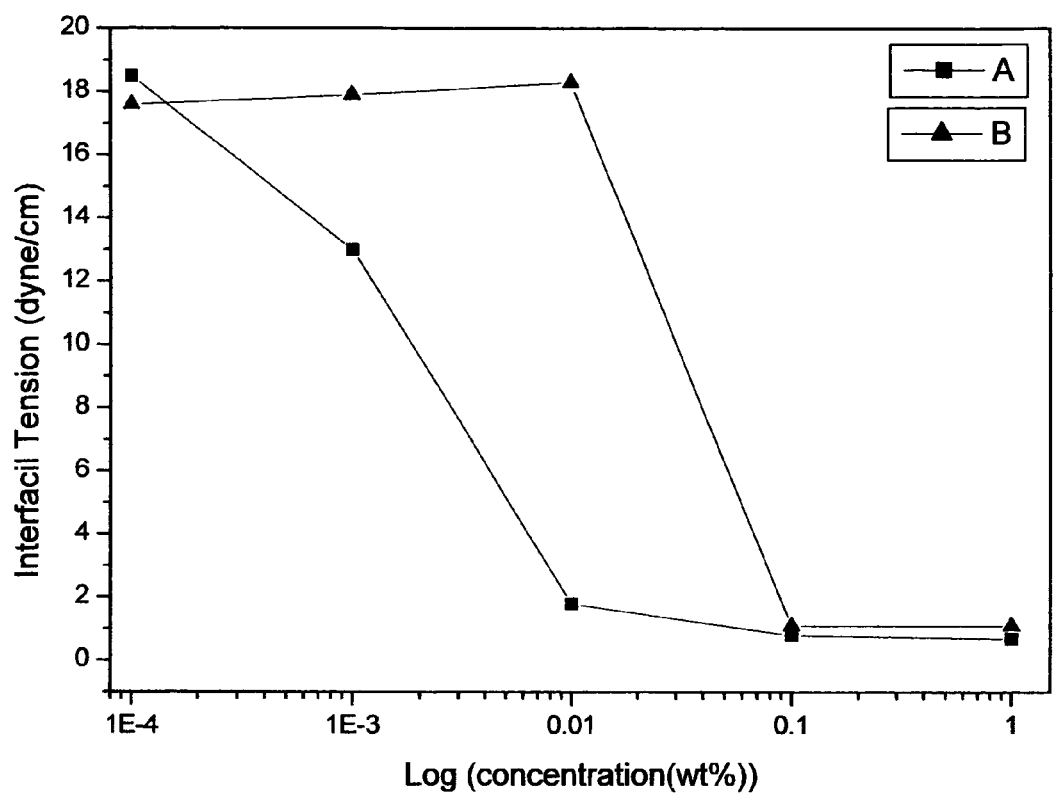
FIG. 2 shows the interfacial tensions of toluene/water when the MMT/AMO complex is added. The result indicates the surfactancy of the complex existing in the interface of toluene/water in rendering the decrease of interfacial tension.

FIG. 2 shows one of the applications for these intercalated complexes. The interfacial tensions of toluene/water significantly decrease with concentrations of the complexes MMT/AMO, both intercalated (curve A) and exfoliated (curve B). Particularly, the interfacial tension of toluene/water drops from 18.5 dyne/cm when the intercalated complex MMT/AMO is added. The interfacial tension can be lowered even to 0.6 dyne/cm when the MMT/AMO complex is added at 100 ppm. That is, the MMT/AMO complex has a low critical micelle concentration (cmc) for surfactancy. Such phenomenon is beneficial to uniformly dispersing inorganic clay in polymers under a nanoscale regime.

Therefore, it can be analogized that polymers such as epoxy resin, polypropylene (PP), polyethylene glycol terephthalate (PET), polystyrene (PS), syndiotactic polystyrene (SPS), polyurethane (PU), Nylon 6 and styrene-acrylnitrile copolymer (SAN), can be easily dispersed in these complexes under a nanoscale regime to form inorganic/organic complex materials. Furthermore, characteristics of polymers such as resistance to heat distortion, gas barrier properties, rigidity, etc., may be improved by mixing with these polymers to form various kinds of nanocomplexes.

Producing the Nanosilicate Plates

The MMT/AMO complex (2 g) is dissolved in toluene (100 ml, 110° C.) to form an emulsion A, and the $Na^+$-MMT (5 g) is dispersed in water (600 ml, 80° C.) by powerfully stirring to form an emulsion B. Next, the emulsion A and the emulsion B are mixed by powerfully stirring at 80° C. for 30 minutes. NaOH solution (5 ml, 5N) is then added into the solution and powerfully stirring at 80° C. for 3 hours. Finally, the nanosilicate plates dispersed in the lower layer can be collected, and simultaneously, the AMO in the upper layer can be recycled for reusing.

The conventional nanomaterial is usually spherical, filmy or cylindrical. The derivative of the clay/AMO complex produced in accordance with the present invention has high aspect ratio and is plate-shaped.

What is claimed is:

1. A method for producing a clay/AMO complex, comprising at least one step of intercalating layered inorganic silicate clay with an intercalating agent, amine terminated-Mannich oligomer (AMO), by powerfully blending at 60-180° C. to perform cation exchange; wherein said intercalating agent is a straight chain polymer formed by polymerizing polyoxyalkylene amine having a molecular weight over 1000, p-cresol and formaldehyde, and before the intercalation step, said intercalating agent is acidified with an inorganic acid, and said layered inorganic silicate clay is swelled with water.

2. The method of claim 1, wherein said layered inorganic silicate clay is selected from the group consisting of montmorillonite, kaolin, mica and talc.

3. The method of claim 1, wherein said layered inorganic silicate clay has a cation exchange capacity ranging from 50 to 200 meq/100 g.

4. The method of claim 1, wherein said polyoxyalkylene amine is selected from the group consisting of polyoxypropylene diamine, polyoxyethylene diamine, and poly(oxyethylene-oxypropylene)diamine adduct.

5. The method of claim 1, wherein said polyoxyalkylene amine is polyoxypropylene diamine.

6. The method of claim 1, wherein said inorganic acid is selected from the group consisting of hydrochloric acid, sulfuric acid, phosphoric acid and nitric acid.

7. The method of claim 1, wherein said intercalating agent is mixed with said layered inorganic silicate clay by powerfully stirring at 80-160° C. to perform cation exchange.

8. The method of claim 1, wherein said intercalating agent is mixed with said layered inorganic silicate clay by powerfully stirring at 80-120° C. to perform cation exchange.

9. The method of claim 1, wherein the mole ratio of said intercalating agent to said cation exchange capacity of said layered inorganic silicate clay is 1:3-2:1, and the mole ratio of said cation exchange capacity to said inorganic acid is about 1:1, thereby obtaining said complex having a layered structure and interlayer distances ranging from 20 to 98 Å.

10. The method of claim 1, wherein the mole ratio of said intercalating agent to said cation exchange capacity of said layered inorganic silicate clay is more than 2:1, and the mole ratio of said cation exchange capacity to said inorganic acid is more than 2:1, thereby obtaining said complex having an exfoliative structure.

11. A method for producing a nanosilicate plate, comprising steps of:
   (A) providing an emulsion A and an emulsion B, wherein said emulsion A is prepared by dissolving said clay/AMO complex obtained in claim 1 in an organic solvent at a predetermined temperature, and said emulsion B is prepared by dispersing said layered inorganic silicate clay used in claim 1 in water at 80° C. and powerfully stirred;
   (B) mixing said emulsion A and said emulsion B by powerfully stirring at a predetermined temperature;
   (C) adding a hydroxide or a chloride of alkali metal or alkaline-earth metal and keeping powerfully stirring; and
   (D) settling said mixture to obtain said nanosilicate plate dispersed in a water phase.

12. The method of claim 11, wherein said organic solvent is selected from the group consisting of ether, ketone, ester, nitrile, saturated hydrocarbon, chloric saturated hydrocarbon and aromatic hydrocarbon.

13. The method of claim 11, wherein said organic solvent is selected from the group consisting of tetrahydrofuran, isopropyl ether, methyl tert-butyl ether, methyl isobutyl ketone, ethyl acetate, pentane, hexane, heptane, cyclohexane, dichloromethane, benzene, toluene, dimethylbenzene, chlorobenzene and methoxybenzene.

14. The method of claim 11, wherein said hydroxide or chloride of alkali metal or alkaline-earth metal is sodium hydroxide.

* * * * *